US 6,697,485 B1

(12) United States Patent
Poulis et al.

(10) Patent No.: US 6,697,485 B1
(45) Date of Patent: Feb. 24, 2004

(54) DATA SIGNAL ATTENUATOR AND SYSTEMS AND METHODS FOR USING SAME

(75) Inventors: Spiro Poulis, Kearns, UT (US); John Evans, Riverton, UT (US); Shayne Messerly, Farmington, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/189,964

(22) Filed: Nov. 10, 1998

(51) Int. Cl.$^7$ ............................................... H04M 1/00
(52) U.S. Cl. ........................ 379/394; 379/398; 379/403; 379/404
(58) Field of Search ............................ 379/93.05, 93.29, 379/394, 398, 399.01, 400, 403, 404, 416, 417; 326/30; 375/222, 257, 258

(56) References Cited

U.S. PATENT DOCUMENTS

| | | | |
|---|---|---|---|
| 4,395,590 A | 7/1983 | Pierce et al. | |
| 5,181,240 A | 1/1993 | Sakuragi et al. | |
| 5,528,131 A | 6/1996 | Marty et al. | |
| 5,790,656 A | 8/1998 | Rahamim et al. | |
| 5,809,068 A | 9/1998 | Johnson | |
| 5,815,567 A | 9/1998 | Davis et al. | |
| 6,091,806 A | * 7/2000 | Rasmus et al. | ........ 379/93.05 |

\* cited by examiner

*Primary Examiner*—Minsun Oh Harvey
*Assistant Examiner*—Jefferey Harold
(74) *Attorney, Agent, or Firm*—Workman, Nydegger

(57) ABSTRACT

The present invention provides apparatus and methods for attenuating signals received from a source over a data transmission line, having an unknown resistance, to achieve optimized signals in various data terminal and data communications equipment. In a preferred embodiment, a resistor network is operably coupled between the transmission line and a means for processing the signal, such as a digital processor, an ADC and a DAC. The resistor network comprises a termination resistor that is associated with a termination voltage, a variable resistor and another resistor. During use, a switch is operably positioned between a plurality of switch positions so that two voltage measurements will lead to the determination of the voltage of the source and the termination voltage within the resistor network. Once these voltages are known, the unknown resistance can be estimated. Thereafter, the length of the transmission line may be determined because of known resistance-per-unit-distance characteristics of the transmission line. In response to knowing this length, the digital processor selects a desired resistance value for the variable resistor so that, upon adjustment of the variable resistor by the DAC, the signal becomes a largest-possible input at the ADC.

17 Claims, 1 Drawing Sheet

DATA SIGNAL ATTENUATOR AND SYSTEMS AND METHODS FOR USING SAME

BACKGROUND OF THE INVENTION

1. The Field of the Invention

The present invention relates generally to data communications. More specifically the present invention relates to apparatus and methods for attenuating signals received from a data transmission line in a data communications environment to achieve optimized signals for processing.

2. The Relevant Technology

In a data communications environment, data is communicated from a sender (data source) to a receiver (data sink) over a data link. In general, the data link includes the transmission medium, such as a wire, appropriate transmission and receiving devices and any intermediary routing devices.

With reference to FIG. 1, a basic conventional embodiment of a data communications environment for communicating data from a sender to a receiver is depicted generally as 20. In this embodiment, as indicated by arrow 22, data is communicated from a data source at one end of the data communications environment to a data sink at another end of the data communications environment. As depicted, a typical data source and sink includes some form of a data terminal equipment (DTE) device 24, such as a terminal or a computer, interfaced with one or more data communications equipment (DCE) devices 26, such as a modem. All are well known in the art.

Electronically separating the data source and the data sink is a transmission medium. typical transmission media include, but are not limited to, wire lines, optical fibers and air. In this embodiment, the transmission medium is a transmission line 28, such as an insulated conductive telephone line found frequently in a plain old telephone service (POTS) system for carrying voice and data signals.

Frequently, an intermediary handler of the data, indicated as node 30, is used to facilitate the data transmission between the data source and data sink. Typical intermediary handlers provide services such as switching functions to route data along an optimized path, mediation handling to modify the data into proper transmission protocols, store-and-forward handling to hold data for a predefined amount of time or more sophisticated services such as time and frequency multiplexing. As an example, a central office 32 in a POTS system serves to provide some or all of the foregoing services.

The physical distance of the transmission line between the intermediary handler and either the data source or sink, however, may range from a few hundred feet to several miles. As is known, this distance causes attenuation in the signal strength of the transmitted data. In general, the greater the distance, the greater the attenuation, and vice versa. As a result, the data sink receives, and must process, data signals having had great attenuation or little to no attenuation. This causes restrictions in the dynamic range of specific DTE and/or DCE devices. For example, an analog-to-digital converter (ADC) in a modem must conventionally accept and process input signals supplied with signal strengths in a range from −9 dbm to as little as −45 dbm.

Accordingly, it would be an advance to overcome the foregoing transmission line attenuation problems and optimize the signals supplied to various data terminal and data communications equipment in a data communications environment.

OBJECTS AND SUMMARY OF THE INVENTION

It is, therefore, an object of the present invention to provide apparatus and methods for attenuating signals received from a data transmission line in a data communications environment.

It is another object of the present invention to provide apparatus and methods for optimizing signals supplied via a data transmission line to data terminal and communications equipment in a data communications environment.

It is still another object of the present invention to provide a modem having means for attenuating signals supplied from a data transmission line in a data communications environment to an internal ADC to achieve signals at the ADC having optimized signal strengths.

It is yet another object of the present invention to provide the foregoing in an economical manner.

In accordance with the invention as embodied and broadly described herein, the foregoing and other objectives are achieved by providing apparatus and methods for attenuating signals received via a data transmission line. An unknown resistance of the transmission line is determined which ultimately leads to the optimization of the signals in various data terminal and data communications equipment.

In a preferred embodiment, a resistor network is operably coupled between the transmission line and a means for processing the signal, such as a digital processor. The resistor network comprises a termination resistor that is associated with a termination voltage, a variable resistor and another resistor.

During use, a switch is operably positioned between a plurality of switch positions so that two voltage measurements will lead to the determination of the voltage of the data source and the termination voltage within the resistor network. Once these voltages are known, the unknown resistance of the transmission line can be estimated. Thereafter, the length of the transmission line may be determined because of known resistance-per-unit-distance characteristics of the transmission line. In response to knowing this length, the digital processor selects a desired resistance value for the variable resistor so that, upon adjustment of the variable resistor, the signal is optimized for processing at the digital processor.

In a more particular embodiment, the digital processor selects the desired resistance value for the variable resistor and a digital-to-analog convertor serves to adjust the variable resistor. Thereafter, the signal is optimized for processing at an input of an analog-to-digital convertor before being supplied to the digital processor.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

The present invention relates to apparatus and methods for attenuating signals received from a data transmission line in a data communications environment to achieve optimized signals in various data terminal and data communications equipment. In one embodiment, the optimized signal is presented as a largest-possible input to an analog-to-digital convertor within a data communications equipment device. It is a feature of this invention that, because the foregoing is readily achieved with little adjustment to conventional equipment in a data communications environment, this invention offers a cost effective solution to the problems previously described.

Figure 1:
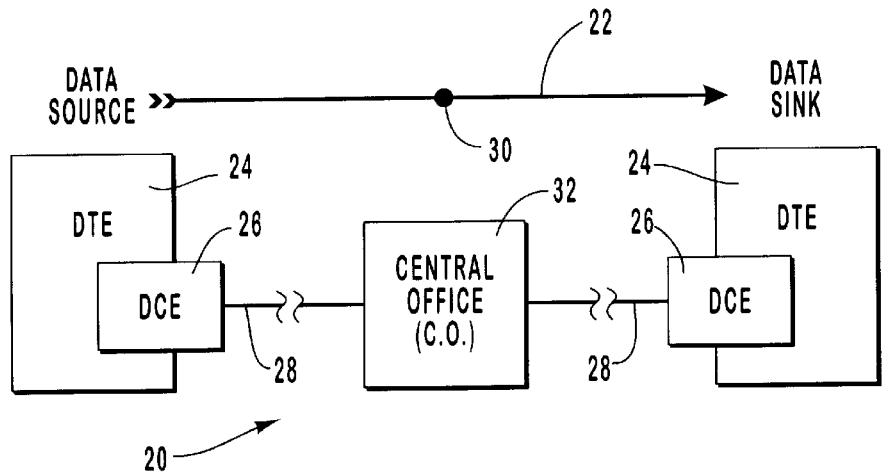
FIG. 1 is a block diagram of a prior art data communications environment.
Figure 2:
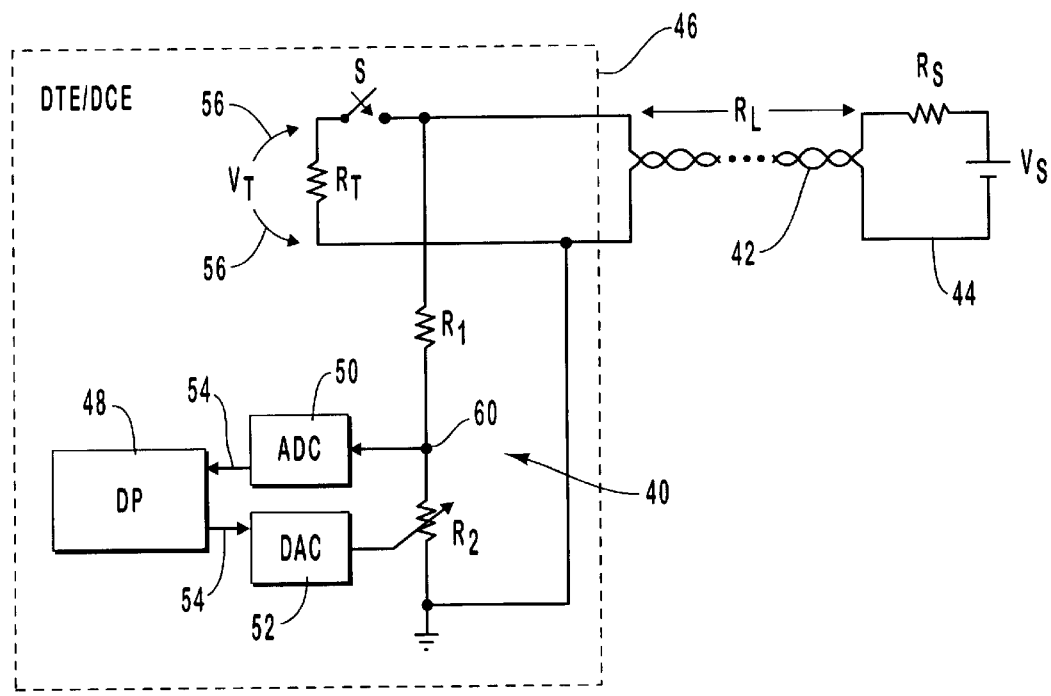
FIG. 2 is a diagram of a data signal attenuator for use with a transmission line in a data communications environment in accordance with the present invention.

With reference to FIG. 2, a preferred embodiment of a data signal attenuator for use with a transmission line in a data communications environment in accordance with the present invention is depicted generally as 40. In general, the data signal attenuator 40 provides a means for determining an unknown resistance, $R_L$, of transmission line 42. Ultimately, this provides for an optimized data signal, such as in largest-possible signal strength, to be supplied to various devices for processing.

As used herein, the transmission line 42 is representative of known transmission medium and is used to convey a data signal from between an intermediary handler of the data signal at one end thereof, such as a central office 44 in a plain old telephone service (POTS) system, to an apparatus 46 at another end thereof. Since a data communications equipment (DCE) or data terminal equipment (DTE) device is capable of transmitting or receiving data signals over the transmission line 42 they are, thus, representative of an apparatus 46 suitable for implementing the present invention.

The intermediary handler will exemplary be described in the context of the central office 44 having a source voltage, $V_s$, and a series lumped direct current (dc) resistance, $R_s$. It will be appreciated, however, that the intermediary handler of the data signal may additionally be any variety of nodes or components for switching, mediating, multiplexing or otherwise handling a data signal in a data communications environment. It is even contemplated that no intermediary handler exists, such as in a known point-to-point direct data connection between communicating DTE devices. In such a situation, the intermediary handler represents the actual data source or data sink of the data signal, depending upon the direction of data signal transmission. For brevity, however, the foregoing will be described as an intermediary handler such as the central office in a POTS.

In a preferred embodiment, the transmission line 42 is any of the conductive wires in a POTS. Still other transmission lines include transmission medium having some resistance value over which a data signal may be conveyed. These embodiments, however, are known by one skilled in the art. As such, they are beyond the scope of the detailed description herein.

In a preferred embodiment, the processing of the data signal conveyed by the transmission line is performed in a DCE device, such as a modem. This processing, in rudimentary form, generally comprises a digital processor (DP) 48 bi-directionally coupled between an analog-to-digital convertor (ADC) 50 and a digital-to-analog convertor (DAC) 52 although only uni-directional arrows 54 are depicted therebetween. As will be described in additional detail subsequently, the uni-directional arrows 54 are used to indicate a preferred methodology for using the present invention. The operations and functions of the DP, ADC and DAC are, also, beyond the scope of this invention. In general, however, these devices are used to provide processing of the data signal so that the information content of the data signal may be eventually ascertained or utilized by other devices. The means for processing the data signal may additionally be performed by other devices such as application specific integrated circuits (ASICs), digital signal processors, microprocessors, CPUs, etc.

Regardless of the actual means for processing the data signal, all processing devices have desired data signal characteristics, such as signal strength, that are preferred when undertaking the processing thereof. When these desired characteristics are realized, the data signal is herein referred to as an optimized data signal. It is to this end that the present invention seeks to determine the unknown resistance of the transmission line 42.

Then, because transmission lines have known attenuation characteristics, usually per unit distance, a length of the transmission line can be determined so that proper adjustment of the data signal, conveyed from the central office 44 to the apparatus 46, can be effectuated to achieve an optimized data signal.

In the embodiment of FIG. 2, the data signal conveyed over the transmission line 42 from the central office 44 to the apparatus 46 is received at the apparatus 46 by a resistor network comprised of a termination resistor, $R_T$, resistor, $R_1$, and a variable resistor, $R_2$. Associated with the termination resistor, $R_T$, is a termination voltage, $V_T$, indicated by arrows 56. In general, the resistor network is operably coupled between the means for processing the data signal, i.e., the DAC, ADC and DP, and the transmission line. The resistor network serves to adjust, preferably by attenuation, the data signal received from the transmission line into an optimized data signal for the processing thereof at the means for processing.

Operably coupled to the resistor network is a switch, S, operable between a plurality of switch positions. In this embodiment, the switch positions are open and closed that respectively correspond with an "on-hook" and an intermediary position where a minimal amount of current is drawn by the apparatus just prior to an "off-hook" indication in a POTS.

During operation, with the switch, S, in the open, or on-hook, position, the source voltage, $V_S$, of the central office is measured. Preferably, this measurement is made by the ADC at the position indicated as $V_T$. Although measured at this position, this first voltage measurement is the source voltage and is not to be considered the termination voltage. In a similar manner, with the switch, S, in the closed position, the termination voltage, $V_T$, across the termination resistor, $R_T$, is measured. This second voltage measurement, however, is to be considered as the termination voltage.

By various circuit analysis techniques, once the source and termination voltages are known, the unknown resistance, $R_L$, of the transmission line 42 is estimated from the equation:

$$R_L \approx \left(\frac{V_S}{V_T} - 1\right)(R_T - R_S);$$

with the source resistance, $R_S$, being known as the series lumped resistance of the central office. Thereafter, the length of the transmission line is estimated from the equation:

$$\text{Length} \approx \frac{R_L}{(\text{Resistance per unit distance})};$$

where the resistance per unit distance is a known characteristic of specific transmission lines. In a preferred embodiment, the actual values representative of these characteristics are stored within the means for processing the data signal, such as in a look-up table in the DP 48. Similarly, the foregoing calculations are also performed with the means for processing the data signal, such as the DP.

Once the calculations are performed, the DP selects a desired resistance value for the variable resistor, $R_2$. The DAC adjusts the variable resistor into this desired resistance value, so that when the resistor network is resistively applied to the data signal from the transmission line, an optimized data signal is presented to the means for processing the data signal. In this embodiment, the optimized data signal is provided for processing as a largest-possible input at an input of the ADC at node 60.

It will be appreciated, as the means for processing the signal is realized by various other implementations, that the means for optimizing the data signal likewise varies. With this embodiment, however, several advantages are realized. For example, since most existing DCEs, such as modems, all presently possess a DAC, ADC and a DP, the foregoing is readily implemented with minimal variation to existing apparatus. This translates into an economical solution for DCE manufacturers. As another example, because the source voltage is measured prior to going off-hook, the system and apparatus is protected from excessive voltages or various other signaling and metering signals, having near proximity to the central office, whose voltage levels may otherwise be catastrophically unsafe to the system and/or apparatus.

The foregoing also represents an advance in the state of the art because it is now possible to adjust incoming data signals, preferably by attenuation, so that an optimized data signal is presented for processing having desired and known characteristics. In this manner, the dynamic range of processing devices, such as DACs, ADCs and DPs, are able to be isolated into a preferred range. No longer will it be a requirement for these devices to accommodate data signals having various and wide-ranging characteristics. Ultimately, this will enable better data signal processing.

While the foregoing represents the preferred embodiment of the present invention, various alternative embodiments are considered within the scope of this invention that are readily intimated by the foregoing description. For example, the present invention may be arranged in an apparatus that is not a DTE or a DCE, but is an apparatus that is operably coupled to one or both of the DTE and DCE.

Another alternative embodiment includes rearranging the placement of the switch, S, in relation to the resistor network. Any position is adequate so long as the source and termination voltages may be measured. Also, the switch, S, may have other switch positions and functions for accomplishing various other tasks as part of a larger circuit, for example.

In a preferred embodiment, the resistor network is arranged such that $R_1$ and $R_2$ have resistance values of orders of magnitude larger in comparison to the termination resistor, $R_T$. It will be appreciated, however, that other resistance values are within the scope of this invention and can be calculated by those skilled in the art. Likewise, the resistor network may be comprised of various other physical layouts, to include the addition or combination of resistors, that still enable the measurement of the source and termination voltages.

While the foregoing invention has been described in terms of an incoming data signal received by a DCE, such as a modem, it should be readily apparent that once the resistance and length of the transmission line are known, for various reasons, amplification may be performed upon a data signal outgoing from the DCE or DTE.

In the event that the apparatus 46 is a DCE device, one preferred embodiment includes a modem conforming to the standards and parameters of the Personal Computer Memory Card International Association (PCMCIA). In particular, a PCMCIA modem is a Type II or Type III "credit card" having dimensions occupying a substantially rectangular space of approximately 55 mm in width, 85 mm in length and 5 or 10.5 mm, respectively, in depth. These cards also have a 68 pin connector on one end thereof for operably mating with a computing configuration, such as a personal computer (PC). Other apparatus 46 embodiments are also supported under this PCMCIA standard and include other architecture cards such as a LAN card, or equivalents thereof, for use in a networked environment.

Typically, PCMCIA cards also contain circuitry for complying with the guidelines established by the Federal Communications Commission ("F.C.C.") and various regional telephone companies. For example, one presently required circuit includes a Data Access Arrangement ("DAA") circuit. The DAA circuit provides an impedance match and also serves to isolate the modem and the computer from transient signals and other disturbances coming in over the phone line. In this manner, the modem acts as a protective barrier between the computer or user input device and the phone lines and moderates all signals or energy being input into the phone lines to protect the phone lines and related systems from damage. Since many DAA circuits are evolving from simple transformer isolation circuits into digitally processed isolation circuitry, the present invention also achieves compatibility therewith because of the digital nature for achieving an optimized data signal.

Although the resistor network is diagrammatically pictured as a physical component layout with calculable resistor values, it will be appreciated that in other alternative embodiments, various other means may be used to achieve the foregoing optimization of data signals received via a transmission line. For example, the resistor network may be replaced with ASICs, active circuits or other passive circuits or any other means for achieving the advantageous taught herein.

The present invention may be embodied in other specific forms without departing from its spirit or essential characteristics. Thus, the described embodiments are to be considered in all respects as illustrative only and not restrictive. The particular scope of the invention is indicated by the appended claims rather than by the foregoing description. All changes that come within the meaning and range of equivalency of the claims are to be embraced within their scope.

What is claimed is:

1. An apparatus for transmitting or receiving a signal over a transmission line having an unknown resistance, the apparatus comprising:

a) a means for processing said signal;

b) a resistor network for operably connecting between said means for processing said signal and said transmission line, said resistor network having means for achieving a desired resistance value and a termination resistance, said termination resistance associated with a termination voltage; and c) a means for determining said termination voltage and a source voltage connected to said transmission line, said means for determining said voltages operably coupled to said resistor network, said unknown resistance being substantially determinable from said termination and source voltages whereby once said unknown resistance becomes known said means for achieving said desired resistance value is adjusted so that said signal is optimized at said means for processing said signal.

2. The apparatus according to claim 1, wherein said apparatus is a data communications equipment.

3. The apparatus according to claim 1, wherein the apparatus is a data terminal equipment.

4. The apparatus according to claim 1, wherein said means for determining said voltages is a switch operable between a plurality of switch positions such that when said switch is adjusted between said switch positions said source and termination voltages are determinable.

5. The apparatus according to claim 1, wherein said means for achieving said desired resistance value comprises a variable resistor.

6. The apparatus according to claim 1, wherein said variable resistor is adjustable by a digital-to-analog converter driven by said means for processing said signal.

7. The apparatus according to claim 1, wherein said means for processing said signal is a digital processor.

8. The apparatus according to claim 1, wherein said source voltage is a voltage from a central office in a plain old telephone service system.

9. The apparatus according to claim 1, wherein said transmission line is a conductive wire in a plain old telephone service system.

10. An apparatus being capable of transmitting and receiving a data signal over a transmission line having an unknown resistance from between a computing configuration and an intermediary handler having a source voltage connected to said transmission line, comprising:

a) a digital processor for processing said data signal;

b) a resistor network capable of operably coupling between said digital processor and said transmission line, said resistor network having a resistor, a variable resistor having a desired resistance value and a termination resistor, said termination resistor associated with a termination voltage; and c) a switch operably coupled to said resistor network having a plurality of switch positions so that as said switch is positioned at said switch positions said source and termination voltages are determinable, said unknown resistance being substantially determinable from said termination and source voltages whereby once said unknown resistance becomes known said variable resistor is capable of adjustment so that said data signal is optimized at said digital processor.

11. A PCMCIA architecture modem capable of transmission and receiving a data signal over a transmittal line having an unknown resistance, comprising:

a) a digital processor;

b) an analog-to-digital converter for processing said data signal interfaced with said digital processor;

c) a digital-to-analog converter for processing said data signal interfaced with said digital processor;

d) a resistor network capable of operably coupling between said digital processor and said transmission line having
   i) a resistor;
   ii) a variable resistor having a desired resistance value; and
   iii) a termination resistor, said termination resistor associated with a termination voltage; and e) a switch operably coupled to said resistor network such that when said switch is in one position, a source voltage connected to said transmission line is capable of being determined, and when said switch is another position, said termination voltage is capable of being determined, said unknown resistance being substantially determinable from said termination and source voltages whereby once said unknown resistance becomes known said digital processor is capable of selecting said desired value of said variable resistor and said digital-to-analog converter is capable of adjusting said variable resistor to achieve said desired value so that said data signal is optimized for processing at said analog-to-digital converter.

12. A system for determining an unknown resistance of a transmission line capable of conveying a signal, comprising:

a) at one end of said transmission line, an intermediary handler of said signal;

b) at another end of said transmission line, a computing configuration for generating or receiving said signal;

c) a data communications equipment device operably coupled with said computing configuration, having
   i) a means for processing said signal;
   ii) a resistor network operably connected to said transmission line having a means for achieving a desired resistance value and a termination resistor, said termination resistor associated with a termination voltage; and
   iii) a means for determining a source voltage of said intermediary handler and said termination voltage, said unknown resistance being substantially determinable from said source and termination voltages whereby once said unknown resistance becomes known said means for achieving said desired resistance value is capable of adjustment so that said signal is optimized at said means for processing said signal.

13. In an apparatus for transmitting and receiving a data signal over a transmission line, said apparatus operably coupled to said transmission line, a method for optimizing said data signal received from a data source via said transmission line having an unknown resistance, the steps comprising:

a) measuring a source voltage of said data source;

b) measuring a termination voltage within said apparatus, said unknown resistance being substantially determinable from said termination and source voltages; and c) adjusting a means for achieving a desired resistance so that said data signal is optimized at a means for processing said data signal, said means for achieving said desired resistance being operably coupled between said transmission line and said means for processing.

14. The method according to claim 13, wherein said apparatus is a modem having a resistor network operably coupled between said transmission line and said means for processing, said step of adjusting said means for achieving said desired resistance so that said data signal is optimized at said means for processing said data signal further comprises the step of selecting said desired resistance for a variable resistor in said resistor network with said means for processing, said desired resistance optimizing said data signal at said means for processing.

15. The method according to claim 14, wherein said step of measuring said source voltage further comprises the steps of:

a) positioning a switch operably coupled to said resistor network in said modem to one position; and b) measuring said source voltage.

16. The method according to claim 15, wherein said step of measuring said termination voltage further comprises the steps of:

a) positioning a switch operably coupled to said resistor network to another position; and b) measuring said termination voltage, said termination voltage being associated with a termination resistor in said resistor network.

17. The method according to claim 16, wherein said means for processing comprises a digital processor interfaced with both an analog-to-digital convertor converter and a digital-to-analog converter, further comprising the steps of:

a) adjusting said variable resistor via said digital-to-analog converter to said desired resistance as selected by said digital processor so that said data signal is optimized at said analog-to-digital converter.

* * * * *

UNITED STATES PATENT AND TRADEMARK OFFICE
CERTIFICATE OF CORRECTION

PATENT NO. : 6,697,485 B1
DATED : February 24, 2004
INVENTOR(S) : Poulis et al.

It is certified that error appears in the above-identified patent and that said Letters Patent is hereby corrected as shown below:

Title page,
Item [56], References Cited, U.S. PATENT DOCUMENTS, change "Rahamim" to -- Rahamin --

Column 1,
Line 33, change "typical" to -- Typical --
Line 46, insert -- , -- after "time"

Column 2,
Line 47, change "convertor" to -- converter --

Column 3,
Line 30, insert -- a -- after "in"

Column 6,
Line 53, change "advantageous" to -- advantages --

Column 7,
Line 13, insert -- , -- after "voltages"
Line 63, change "transmittal" to -- transmission --

Column 8,
Line 14, insert -- in -- after "is"
Line 20, insert -- , -- after "resistor"

Signed and Sealed this

Twenty-fourth Day of August, 2004

JON W. DUDAS
*Director of the United States Patent and Trademark Office*